United States Patent [19]

Huff

[11] 4,310,195
[45] Jan. 12, 1982

[54] CAMPING TRAILER HAVING A FOLD OUT BODY AND INCLUDING A FRAME SUPPORTING A TENT

[75] Inventor: Arlen L. Huff, South Bend, Ind.

[73] Assignee: Robert A. Monnig, Glasgow, Mo.

[21] Appl. No.: 442

[22] Filed: Jan. 2, 1979

[51] Int. Cl.³ .............................................. B60P 3/34
[52] U.S. Cl. .................................. 296/173; 135/3 A
[58] Field of Search ................. 296/169, 173, 27, 197, 296/159, 163, 168, 174; 135/1 A, 3 A, 5 A, 1 R, 3 R

[56] References Cited

U.S. PATENT DOCUMENTS

| Re. 27,605 | 3/1973 | Laney | 296/173 |
|---|---|---|---|
| 2,704,522 | 3/1955 | Frieder et al. | 135/3 R X |
| 3,095,231 | 6/1963 | Reed | 296/173 |
| 3,697,122 | 10/1972 | Richards | 296/173 |
| 3,703,181 | 11/1972 | Tholen | 135/3 A X |
| 3,826,270 | 7/1974 | Hentger | 135/1 R X |
| 4,057,282 | 11/1977 | Kidd | 296/173 X |
| 4,093,302 | 6/1978 | Adams | 296/100 X |

FOREIGN PATENT DOCUMENTS

| 5382 | 9/1979 | European Pat. Off. | 296/173 |
|---|---|---|---|
| 1430707 | 1/1969 | Fed. Rep. of Germany | 296/173 |
| 1958630 | 6/1970 | Fed. Rep. of Germany | 296/159 |

Primary Examiner—David M. Mitchell
Assistant Examiner—Norman L. Stack, Jr.
Attorney, Agent, or Firm—Oltsch, Knoblock & Hall

[57] ABSTRACT

A camping trailer having a fold out body in which the top of the body is hinged to the base of the body and carries a luggage rack which servs as a ground support when the trailer is opened. A frame is supported by the body in its open position and carries a tent.

5 Claims, 9 Drawing Figures

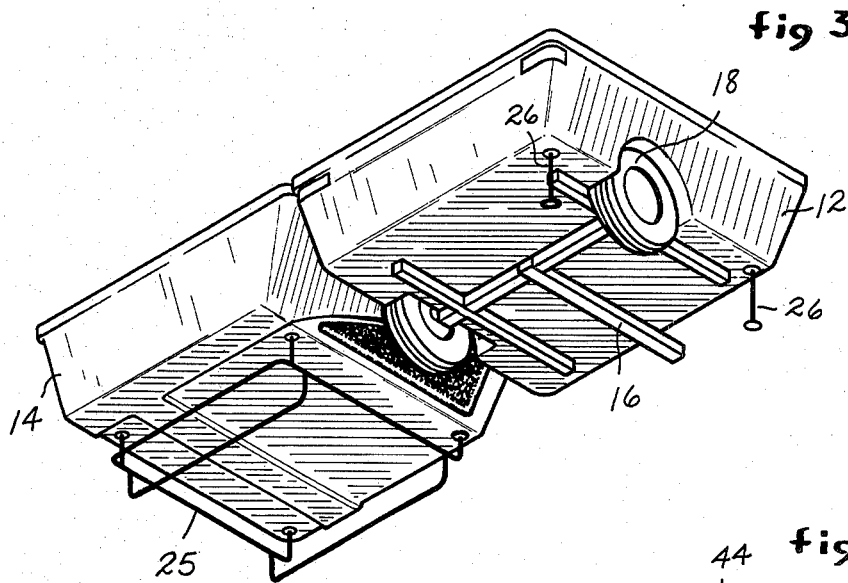
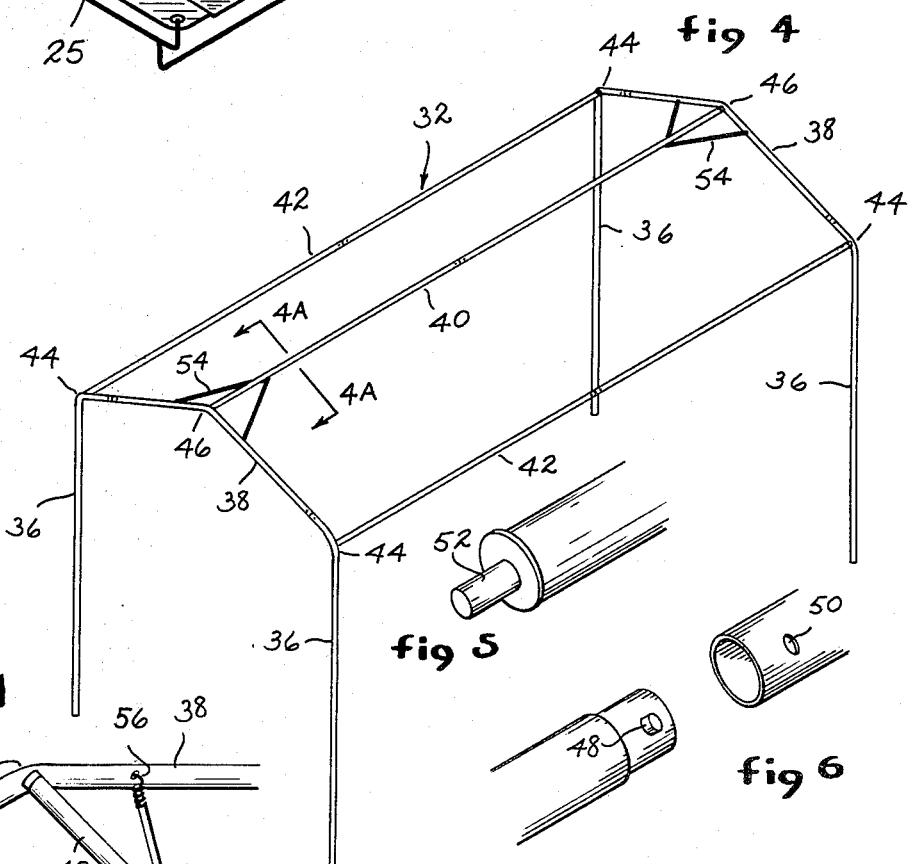
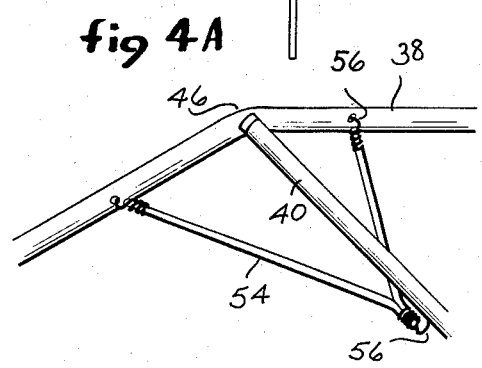
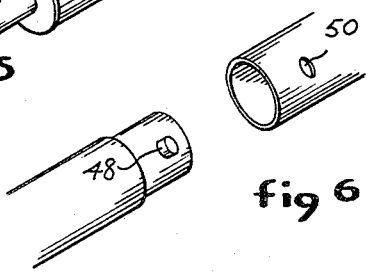
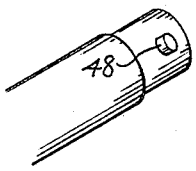

CAMPING TRAILER HAVING A FOLD OUT BODY AND INCLUDING A FRAME SUPPORTING A TENT

SUMMARY OF THE INVENTION

This invention relates to a camping trailer and will have particular application to a collapsible type trailer having a fold out body which supports a frame and a tent applied thereover.

In the trailer of this invention the top of the body is hinged to the base of the body. When the trailer is open the top is folded laterally outwardly from the base of the body. The top includes a luggage rack which engages the ground when the trailer is open to support the top in a horizontal orientation relative to the base of the body. A tubular take-down frame is provided. The frame is supported by both the top and base of the trailer and is retained in an upright position by elastic cords before the tent is applied thereover. The construction of the trailer is of a compact nature which allows for rapid, easy set-up and take-down of the trailer for camping purposes.

It is an object of this invention to provide a camping trailer which is of compact design and which is of reliable operation.

Another object of this invention is to provide a camping trailer having a body which supports a take-down tubular frame supporting a tent.

Still another object of this invention is to provide a trailer which has a body having a base and hinged top part in which the top part carries a luggage rack usable as a ground support when the top part is opened and the trailer made ready for occupancy.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 3 is a perspective view of the trailer as seen from below and shown in its open mode.

FIG. 4 is a perspective view of the frame for the tent of the trailer shown in its assembled form.

FIG. 4A is a detailed view of that portion of FIG. 4 as seen from line 4A—4A.

FIG. 5 is a fragmentary enlarged view of one end of a longitudinal part of the trailer frame in disassembled form.

FIG. 6 is a fragmentary perspective view of component parts of the tent frame showing a telescoping interlocking fit.

DESCRIPTION OF THE PREFERRED EMBODIMENT

Figure 1:
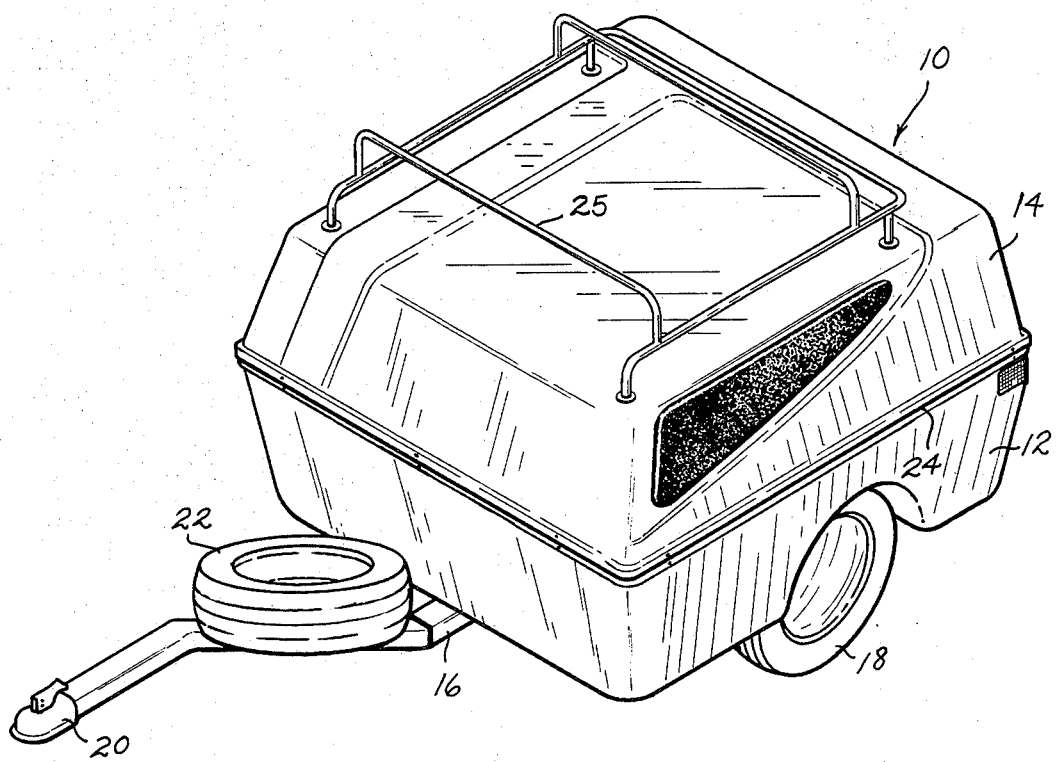
FIG. 1 is a perspective view of the trailer shown in its closed or traveling mode.
Figure 2:
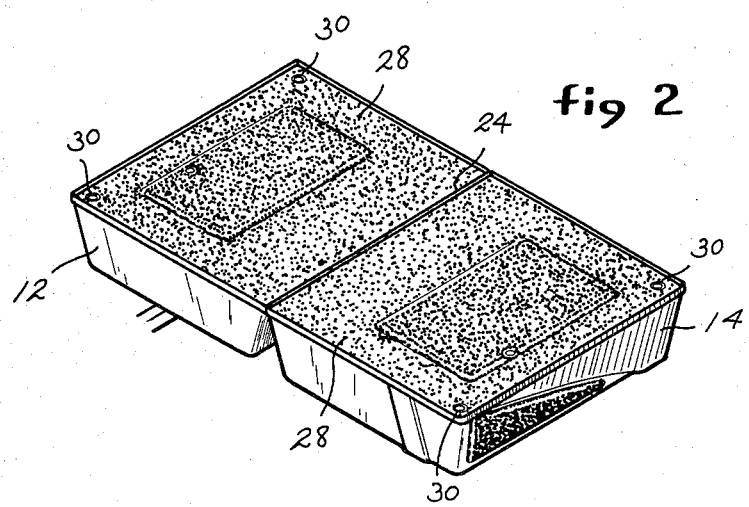
FIG. 2 is a fragmentary perspective view of the trailer body shown in its open or occupancy mode.

The preferred embodiment illustrated is not intended to be exhaustive or to limit the invention to the precise form disclosed. It is shown and described in order to best explan the principles of the invention and its application and practical use to enable others skilled in the art to make use of the invention.

Trailer 10 includes a body having a base part 12 and a top part 14. Body base part 12 is supported by a frame 16 carrying wheels 18. A coupler 20 for connection to a hitch is attached to the tongue of frame 16. Additionally the frame tongue carries a spare wheel 22.

Body top part 14 is hinged at 24 to body base part 12 along corresponding overlying side edges. This permits top part 14 to be swung laterally outwardly about its hinge connection 24 from the closed traveling position shown in FIG. 1 to the open occupiable position illustrated in FIGS. 2, 3, 7 and 8. In this manner the body of trailer 10 has its base part 12 and hinged top part 14 operating in a clam shell effect between open and closed positions of the trailer. Body top part 14 includes a luggage rack 25. During traveling movement of trailer 10, rack 25 serves as a retainer for extra luggage. When the trailer is stopped and the body top part 14 swung into its open position, rack 25 engages the ground and serves as a support for the top part. With trailer 10 having its base part 12 supported by its wheels 18 and extendable pods 26 and with body top part 14 in its open position supported by rack 25, the upper edges of the base and top parts will essentially lie in the same plane. Suitable latches or tie-downs (not shown) are included to secure top part 14 to base part 12 in its closed position.

Each of base part 12 and top part 14 includes an elevated floor 28. A door is mounted in each floor 28 to allow access under the floor for storage purposes. A socket bracket 30 is mounted in each corner of floor 28 adjacent the respective free side edge of base part 12 and top part 14 of the body. Brackets 30 are utilized to anchor a frame 32 to the trailer. Frame 32 is utilized to support the tent 34 of the trailer.

Frame 32 is of a tubular, light-weight metal construction, such as aluminum, and includes multiple take-down parts which allows the frame to be conveniently stored under floors 28 of base and top parts 12 and 14. Frame 32 includes four corner posts 36, two transverse V-shaped parts 38, a center longitudinal part 40, and two side longitudinal parts 42. Each corner post 36 has a bent 44 formed in its upper end and is removably fitted at its lower end into a bracket 30. A transverse part 38 of the frame is connected between two corner posts 37 at each end of the trailer body with top part 14 in its open position. Each transverse part 38 is positioned so that its apex 46 projects upwardly. The connection between each transverse part 38 and its connecting corner posts 36 may be of a detachable telescopic fit such as that illustrated in FIG. 6. The male portion of each telescopic joint is provided with a spring biased pin 48 which engages and fits into a hole 50 formed in the female receiving part of the frame connection. Each end of longitudinal parts 40 and 42 is provided with a pin 52 as illustrated in FIG. 5. Longitudinal part 40 extends over the body of trailer 10 with top part 14 in its open position and has its pins 52 fitted into openings formed in apexes 46 of transverse parts 38. Longitudinal parts 42 extend along opposite sides of the trailer body and are fitted at their pinned ends into openings formed in each bend 44 of corner posts 36. The frame as described is held together prior to the application of tent 34 by elastic cord retainers 54.

Figure 7:
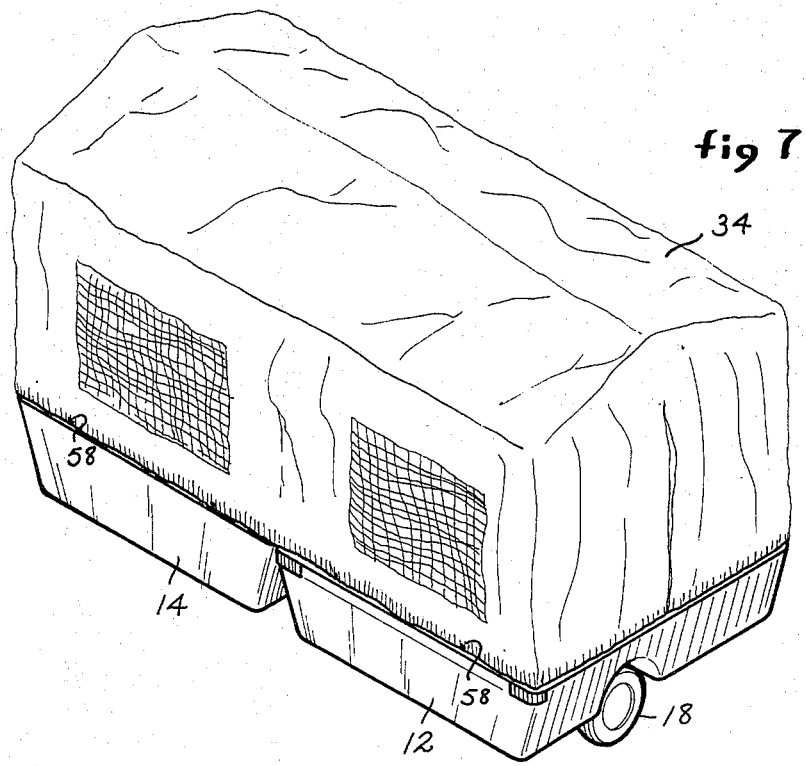
FIG. 7 is a perspective view of the trailer in its open mode having the tent applied thereover.
Figure 8:
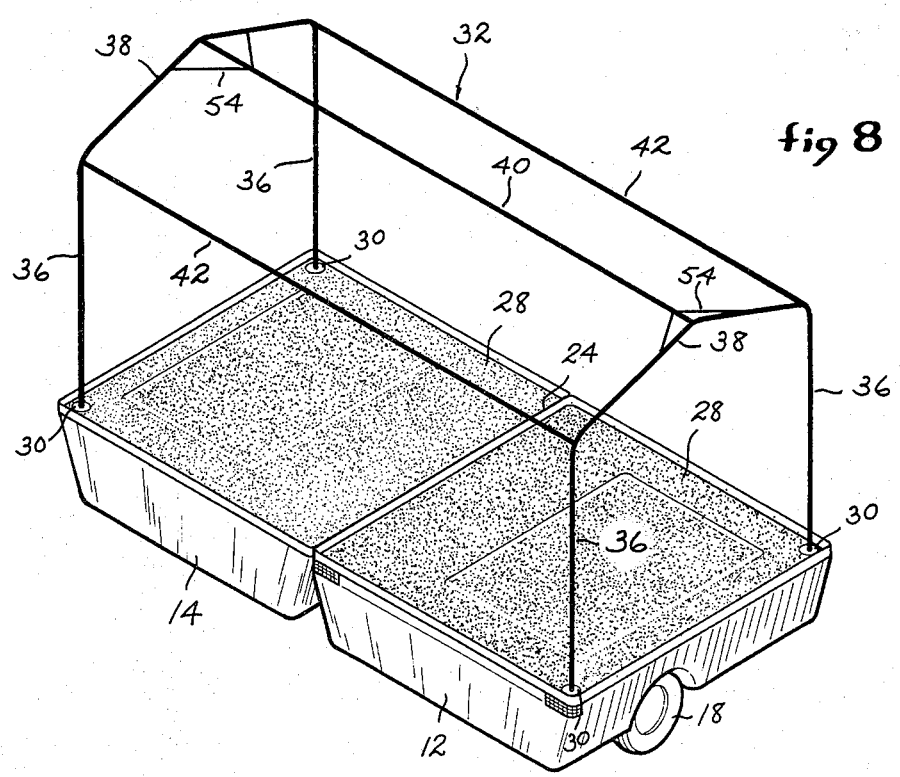
FIG. 8 is a perspective view of the trailer in its open mode showing the tent frame as carried by the trailer body base and top.

Each retainer 54 extends between longitudinal part 40 and a transverse part 38 adjacent apex 46 of the transverse part, as illustrated in FIG. 4A. Retainers 54 are retained by means of hooks 56 inserted into openings formed in transverse parts 38 and longitudinal part 40. For the convenience of storing frame 32, each longitudinal part 40 and 42 is of a two-section construction joined intermediate its ends by a detachable telescopic fit such as that shown in FIG. 6. Once tent 34 has been applied over assembled frame 32, as shown in FIG. 7, retainers 54 may be removed if desired since the frame will remain in assembled form. Tent 34 is connected at its lower edge to the upper edges of body base and top parts 12 and 14 by snaps 58.

The frame as above described may be assembled and disassembled in a rapid and convenient manner. When disassembled it is stored with tent 34 beneath floors 28 of base part 12 and top part 14 of the trailer body.

It is to be understood the invention is not to be limited to the details above given but may be modified within the scope of the appended claims.

What I claim is:

1. A trailer including a body supported by wheels, said body having a four sided peripheral edge portion defined by four corner sections, a storable tubular frame carried by said body, said frame projecting above said body edge portion, a tent supported by said frame over said body, an improvement in said trailer wherein said frame includes (a) four corner posts each releasably secured at one end to a said body corner section and extending generally vertically upwardly therefrom and terminating in a bent portion, two inverted V-shaped parts each having a center apex, each V-shaped part releasably interfitted at each of its ends to the bent portion of a said corner post to form a continuous frame section from one body corner section to another body corner section, a center longitudinal part overlying said body and having each end in abutment with a V-shaped part at its apex, first and second side longitudinal parts extending along opposite sides of said body and paralleling said center longitudinal part, said side longitudinal parts having each end in abutment with a corner post at its bent portion, whereby said center and side longitudinal parts form an overhead support for said tent, and (b) a releasable elongated shape retaining expandable member extended in tension between said center longitudinal part and each V-shaped part adjacent its apex to secure the corner posts and attached V-shaped part and longitudinal parts together as an integral unit for supporting said tent, said V-shaped and longitudinal parts being disconnectable for storage purposes upon release of each expandable member, said tent supported in an expanded position by said corner posts and V-shaped and longitudinal parts of said frame when secured together by each expandable member.

2. The trailer of claim 1 wherein the interfit between each corner post and V-shaped part is a detachable telescopic fit.

3. The trailer of claim 2 wherein the center longitudinal part includes a pin at each end, each V-shaped part having an opening formed in its apex, each center longitudinal part pin fitting into a said opening in a V-shaped part.

4. The trailer of claim 3 wherein each side longitudinal part includes a pin at each end, each corner post having an opening formed in its bent portion, each side longitudinal part pin fitting into a said opening in a corner post.

5. The trailer of claim 4 wherein each side and center longitudinal parts is of a multiple piece form having the pieces thereof joined in a detachable telescopic fit.

* * * * *